United States Patent [19]
Kontz

[11] 3,761,212
[45] Sept. 25, 1973

[54] OVERLOAD ARM FOR MOLD

[75] Inventor: Robert F. Kontz, Toledo, Ohio

[73] Assignee: Owens-Illinois, Inc., Toledo, Ohio

[22] Filed: Jan. 7, 1972

[21] Appl. No.: 216,213

[52] U.S. Cl. .................... 425/154, 425/DIG. 205
[51] Int. Cl. ............................................ B29c 11/00
[58] Field of Search ............... 425/DIG. 205, 154, 425/151, DIG. 45, 450; 74/581, 584, 585

[56] References Cited
UNITED STATES PATENTS

| | | | |
|---|---|---|---|
| 1,382,625 | 6/1921 | Clouse | 74/585 X |
| 3,116,923 | 1/1964 | Gunther | 74/581 X |
| 3,344,475 | 10/1967 | Gioe | 425/450 X |
| 3,402,431 | 9/1968 | Folgelberg et al. | 425/DIG. 205 |
| 3,585,682 | 6/1971 | Martelli | 425/DIG. 211 |

Primary Examiner—Richard B. Lazarus
Attorney—Philip M. Rice et al.

[57] ABSTRACT

Each mold half in a blow molding machine is caused to swing between open and closed positions by a power driven crank and an interconnecting link. The link has a toggle-like joint intermediate its ends, which is normally maintained as a rigid non-flexing joint by a compression spring. If an obstruction prevents either mold half from reaching its closed position, the spring at the joint in the associated link yields to permit the joint to flex, thereby providing a lost-motion connection between the crank and the mold half.

4 Claims, 6 Drawing Figures

OVERLOAD ARM FOR MOLD

BACKGROUND OF INVENTION

The present invention relates to improvements in a high speed blow molding machine, such as is disclosed in the co-pending commonly assigned application of Criss and Pollitt, Ser. No. 835,091, filed June 20, 1969 now U.S. Pat. No. 3,652,751 and entitled "Method and Apparatus for Blow Molding Plastic Articles."

Each half of the blow mold is caused to swing between an open and closed position by a positive mechanical drive. Serious and clostly damage could result to the molds or the machine in the event that an unejected blown article or other foreign material prevents closing of the mold havles.

Accordingly, it is the primary object of this invention to provide a safety device which permits the positive mechanical drive to continue to operate, while automatically yielding in the event that an obstruction prevents full closing of the mold.

DETAILED DESCRIPTION OF THE INVENTION

Figure 1:
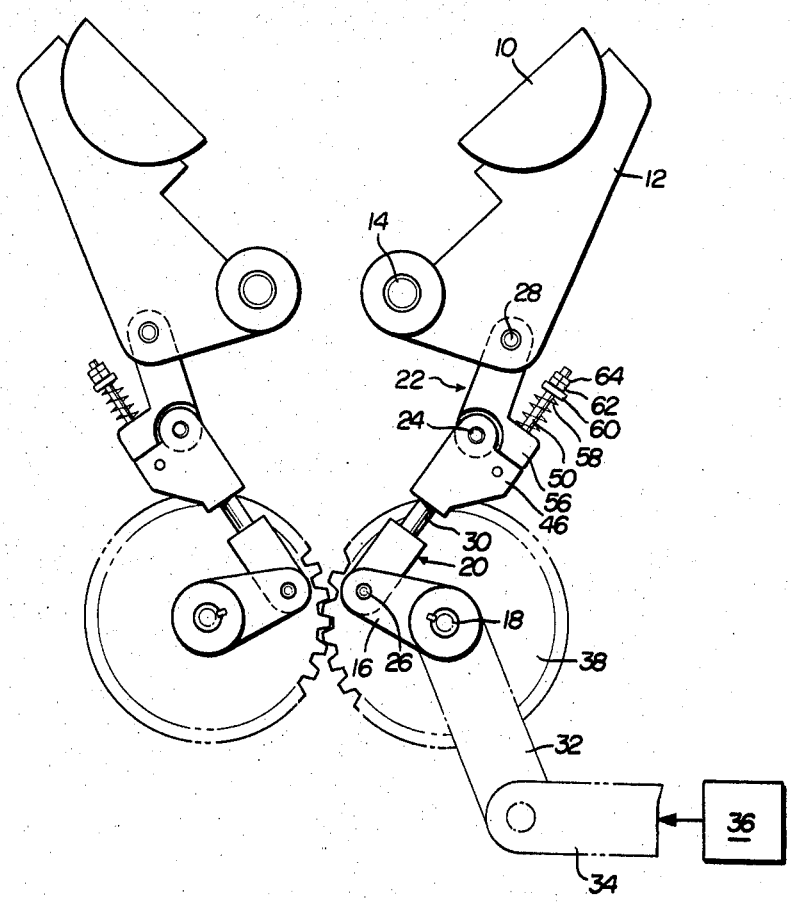
FIG. 1 is a plan view of the two halves of a mold and the associated driving mechanism, with the molds shown in the open position.

Referring to FIG. 1 in particular, a pair of blow mold halves 10, 10a, are carried by arms 12, 12a for pivotal movement about guide posts 14, 14a. The entire illustrated structure is symmetrically opposite, and identical reference numerals have been applied to the corresponding elements associated with each mold half, with the suffix "a" applied to those in the left half of FIG. 1. Accordingly, only the structure on the right half of FIG. 1 will be described, it being understood that the same construction and explanation applies to the opposite half.

Figure 5:
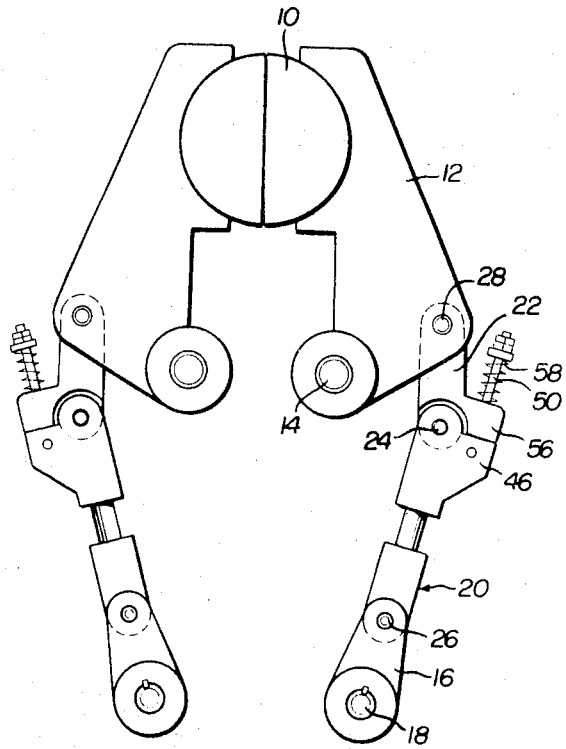
FIG. 5 is a plan view similar to FIG. 1, but showing the molds and associated linkage in closed position.

Mold half 10 is shown in its fully open position. A positive drive mechanism causes it to rotate in a counter-clockwise direction about guide post 14 to its closed position, as illustrated in FIG. 5. This drive mechanism comprises a crank 16 keyed to shaft 18, and first and second links 20, 22 pinned together at 24. First link 20 is connected by pin 26 to crank 16, while second link 22 is connected to blow mold arm 12 by pin 28. First link 20 has two segments, which are interconnected by a length adjusting rod 30 threaded at both ends to provide a turnbuckle type of length adjusting connection.

A second crank 32 is also keyed to shaft 18, and is pivotally connected at tis opposite end to a drive link 34 which is caused to reciprocate by a power source schematically illustrated at 36. It is to be understood that the particular means for causing shaft 18 to oscillate does not form a portion of the present invention. Mold halves 10, 10a are caused to swing toward and away from each other in unison by intermeshing gears 38, 38a, which are keyed to shafts 18, 18a, respectively. Although not essential to the operation of the present invention, it should be noted that the entire structure illustrated, with the exception of elements 32, 34, 36, reciprocates vertically along shafts 14 and 18, as the molds receive the unblown parison, eject the blown article, and return to receive another unblown parison. This cycle is described in the copending application referred to above.

Figure 2:
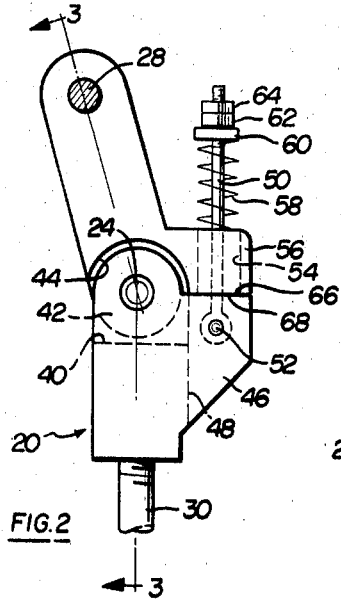
FIG. 2 is an enlarged plan view of a portion of the mold positioning linkage.
Figure 3:
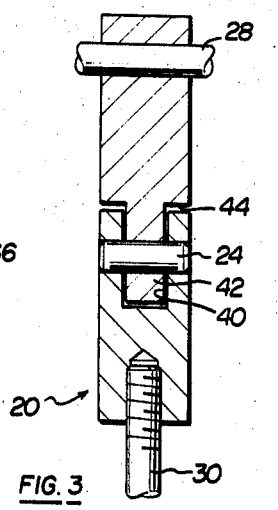
FIG. 3 is a cross-section of the linkage, viewed in the direction of arrows 3—3 of FIG. 2.
Figure 4:
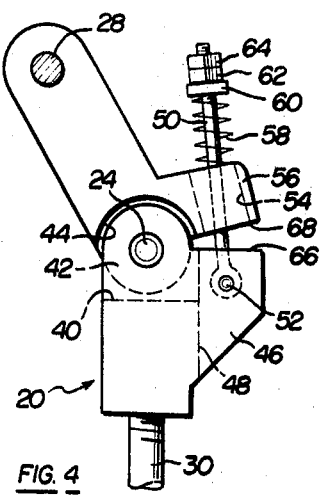
FIG. 4 is a view of the linkage similar to that of FIG. 2, but showing it in the condition which it assumes when an obstruction prevents closing of the mold.

As best illustrated in FIGS. 2-4, a first link 20 has a central slot 40 at one end to form a yoke to receive a tongue 42 on second link 22. Recesses 44 on each side of tongue 42 prevent interference between the ends of the two links 20, 22.

A boss 46 extends laterally from the end of link 20, and is similarly provided with a central slot 48 within which one end of spring rod 50 is pivotally mounted on pin 52 anchored to boss 46 on each side of slot 48. Spring rod 50 extends through a clearance hole 54 in a corresponding boss 56 on second link 22. Rod 50 carries a spring 58, which is held in compression between boss 56 and a washer 60 which is adjustably positioned on rod 50 by nuts 62, 64.

Spring 58 is preferably a compression spring of sufficiently high rate to maintain links 20 and 22 in the relationship shown in FIGS. 1, 2 and 5 during normal operation of the machine, with opposed faces 66, 68 of bosses 46, 54 in abutting contact with each other.

OPERATION

The molds are shown in their open position in FIG. 1. The molds are closed by leftward movement of link 34, which causes cranks 32 and 16 to rotate clockwise. This in turn causes the compound link 20, 22 to move upward and to the right, forcing mold arm 12 to pivot about guide shaft 14 in a counterclockwise direction toward the closed position of FIG. 5. Symmetrically opposite motion of mold half 10a is produced through the action of gears 38, 38a.

Compression spring 58 is stiff enough so that there will be no flexing of links 20, 22, reltative to each other about the interconnecting pivot pin 24. In other words, compound link 20, 22 normally acts as a single rigid link interconnecting pivot pin 26 on crank 16 with pivot pin 28 on mold arm 12.

Figure 6:
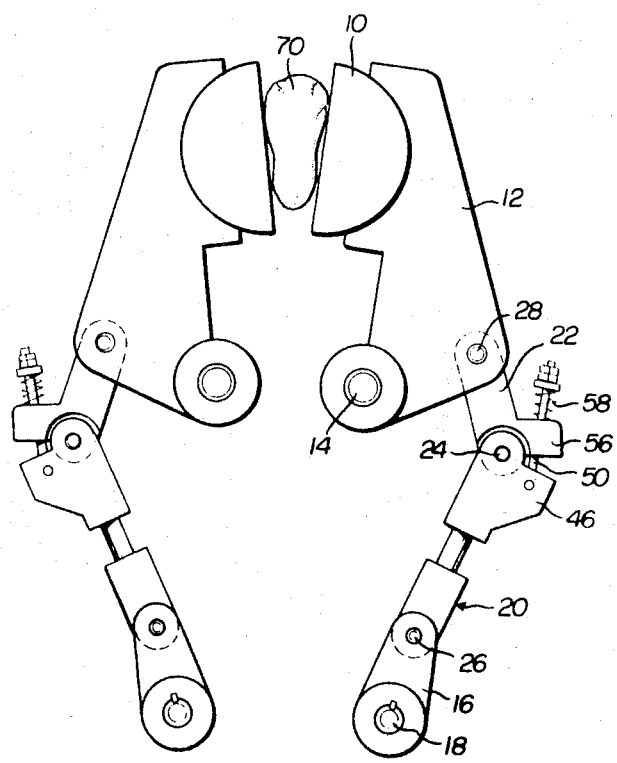
FIG. 6 is a view similar to FIG. 5, but showing the configuration of the linkage when na obstruction prevents closing of the mold halves.

If, however, compound link 20, 22 were at all times a rigid link, any obstruction preventing full motion of mold arm 12 toward the closed position would cause a fracture or other failure of some portion of the positive mechanical drive or mold. To avoid this danger, the present construction provides a safety or overload protective feature. FIG. 6 illustrates an obstruction 70 between mold halves 10, 10a, preventing full closure thereof, which would bring the safety feature into operation.

As soon as substantial resistance to the swinging of mold arm 12 is encountered, a lost-motion action occurs in the compound link. It will be observed from FIG. 1 that pivot pin 24 lies slightly to the right of a line interconnecting pivot pins 26 and 28. Therefore, when obstruction 70 prevents further movement of pin 28 on mold arm 12, continued thrust on first link 20 from crank 16 causes pivot pin 24 to go further over center and to swing outward to the right as the joint between links 20 and 22 in effect flexes or collapses against the force of spring 58. This is best illustrated in FIGS. 4 and 6, where it will be seen that the gap between abutting faces 66 and 68 has opened up.

In comparing the normally fully closed condition of the mold in FIG. 5 with the obstructed condition of FIG. 6, it will be seen that second link 22 has pivoted outward counter-clockwise in FIG. 6 to absorb the travel of crank 16 and first link 20. It is to be understood, however, that compression spring 58 is sufficiently stiff to prevent any flexing of the joint between links 20 and 22 during normal operation of the machine.

Thus, the unique connection between links 20 and 22 provides a safety device which prevents damage or destruction of the drive mechanism or molds in the event of an obstruction between the mold halves.

This invention may be further developed within the scope of the following claims. Accordingly, the above specification is to be interpreted as illustrative of only a single operative embodiment of this invention, rather than in a strictly limited sense.

I now claim:

1. In a blow modling machine wherein opposed blow mold havles are each pivotally mounted to swing between open and closed positions under the control of an associated power driven crank, the improved driving connection between each mold half and its associated crank which comprises a normally rigid but selectively resiliently yieldable link pivotally connected at its opposite ends to the power driven crank and to the mold half, said link comprising two rigid members pivotally interconnected at a point located intermediate said opposite ends of said link and lying slightly offset from a line interconnecting the pivot points at said opposite ends so that said members form a large obtuse angle at said joint, resilient means carried by said link for normally maintaining said members in a fixed angular relationship to each other at said joint during normal operation to transmit the motion of the crank to the mold half, but in the event of an obstruction which prevents the full closing of a mold half, said resilient means yielding to permit said members to pivot relative to each other to thereby permit a normal full stroke of the crank notwithstanding the shortened swing of the mold half.

2. In a blow molding machine wherein opposed blow mold havles are each pivotally mounted to swing between open and closed positions under the control of an associated power driven crank, the improved driving connection between each mold half and its associated crank which comprises:
   a first rigid link having a first end pivotally connected to the crank;
   a second rigid link having a first end pivotally connected to the mold half;
   the second ends of said first and second links being pivotally connected to each other at a resiliently yieldable joint, the axis of said joint normally lying slightly to one side of a line interconnecting the axes of said pivot connections at the respective first ends of said first and second links;
   said first and second links each having an abutment face adjacent said joint, and said links carrying resilient means for biasing said abutment faces into contact with each other to normally maintain said links in a constant angular relationship at said joint throughout the normal opening and closing cycle of the mold halves;
   in the event of an obstruction which prevents a full swing of a mold half to its closed position, said resilient means yielding to permit said abutment faces to separate and said links to pivot relative to each other at said joint, said joint thereby providing a lost-motion connection between the crank and the mold half in the event of an obstruction between the mold halves.

3. The blow molding machine of claim 2, wherein said resilient means comprises a compression spring having means associated therewith for setting the force required to cause said yieldable joint to yield.

4. The blow molding machine of claim 2, wherein one of said first and second links carries means for adjusting the normal distance between said crank and mold half connections.

* * * * *